US005917447A

United States Patent [19]

Wang et al.

[11] Patent Number: 5,917,447

[45] **Date of Patent: *Jun. 29, 1999**

[54] METHOD AND SYSTEM FOR DIGITAL BEAM FORMING

[75] Inventors: Shay-Ping T. Wang, Long Grove, Ill.; Stephen Chih-Hung Ma, Mesa; James M. Richey, Phoenix, both of Ariz.; Shao Wei Pan, Lake Zurich, Ill.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/654,946

[22] Filed: May 29, 1996

[51] Int. Cl.[6] .......... G01S 3/16; H01Q 3/22

[52] U.S. Cl. .......... 342/383; 342/368

[58] Field of Search .......... 342/377, 383, 342/368, 372

[56] References Cited

U.S. PATENT DOCUMENTS

| | | | |
|---|---|---|---|
| 4,163,235 | 7/1979 | Schultz | 343/100 |
| 4,212,084 | 7/1980 | Poole | 367/118 |
| 4,216,475 | 8/1980 | Johnson | 343/100 |
| 4,316,192 | 2/1982 | Acoraci | 343/100 |
| 4,626,825 | 12/1986 | Burleson et al. | 340/347 |
| 4,728,956 | 3/1988 | Wallington | 342/371 |
| 4,752,969 | 6/1988 | Rilling | 455/278 |
| 4,827,268 | 5/1989 | Rosen | 342/368 |
| 4,882,588 | 11/1989 | Renshaw et al. | 342/373 |
| 4,883,244 | 11/1989 | Challoner et al. | 244/171 |
| 4,905,143 | 2/1990 | Takahashi et al. | 364/200 |
| 5,134,417 | 7/1992 | Thompson | 342/375 |
| 5,218,359 | 6/1993 | Minamisono | 342/383 |
| 5,274,384 | 12/1993 | Hussain et al. | 342/373 |
| 5,369,663 | 11/1994 | Bond | 342/383 |
| 5,430,451 | 7/1995 | Kawanishi et al. | 342/354 |
| 5,434,578 | 7/1995 | Stehlik | 342/383 |
| 5,671,168 | 9/1997 | Liu et al. | 364/724.18 |

FOREIGN PATENT DOCUMENTS

| | | | |
|---|---|---|---|
| 2265053 | 9/1993 | United Kingdom | H01Q 3/26 |

OTHER PUBLICATIONS

Method of Null Systems in Phased Array Antenna Systems, B.E. Stuckman et al., Electronic Letters, 19th Jul. 1990, vol. 26, No. 15, pp. 1216–1218.

Fundamentals of Digital Array Processing, Dan E. Dudgeon, Proceedings of the IEEE, vol. 65, No. 6, Jun. 1977, pp. 898–904.

Digital Beamforming Antennas—An Introduction, Hans Steyskal, Microwave Journal, Jan. 1987, pp. 107–124.

A 30–b Integrated Logarithmic Number System Processor, Lawrence K. Yu et al., IEEE Journal of Solid–State Circuits, vol. 26, No. 10, Oct. 1991, pp. 1433–1440.

(List continued on next page.)

*Primary Examiner*—Gregory C. Issing
*Attorney, Agent, or Firm*—Dana B. LeMoine

[57] ABSTRACT

A digital beam forming system includes an array of computing units (60–76) for weighting incoming signals and a plurality of summing processors (80–84) for generating output signals that represent weighted sums corresponding to rows within the array. The digital beam forming system can be incorporated in either a transmitter or receiver used in a radio frequency communications system.

9 Claims, 5 Drawing Sheets

OTHER PUBLICATIONS

An Architecture for Addition and Subtraction of Long Word Length Numbers in the Logarithmic Number System, David M. Lewis, IEEE Transactions on Computers, vol. 39, No. 11, Nov. 1990, pp. 1325–1336.

Algorithmic Design for a 30 bit Integrated Logarithmic Processor, David M. Lewis et al., Proceedings on 9th Symposium on Computer Arithmetic, 1989, IEEE Comp. Soc. Press, pp. 192–199.

A Logarithmic Vector Processor for Neural Net Applications, Steve Richfield, IEEE First International Conference on Neural Networks, Jun. 21–24, 1987, pp. 22–28.

Comments on An Architecture for Addition and Subtraction of Long Word Length Numbers in the Logarithmic Number System, M. Arnold et al., IEEE Transactions on Computers, vol. 41, No. 6, 1992, pp. 786–788.

Redundant Logarithmic Arithmetic, Mark G. Arnold et al., IEEE Transactions on Computers, vol. 39, No. 8, Aug. 1990, pp. 1077–1086.

A Multiplier–Less Digital Neural Network, L. Spaanenburg et al., Proceedings of the 2nd International Conference on Microelectronics for Neural Networks, German Section of the Institute of Electrical and Electronics Engineers, Published by Kyrill & Method Verlag, Oct. 16–18, 1991.

Redundant Logarithmic Number Systems, M. G. Arnold et al., Proceedings of 9th Symposium on Computer Arithmetic, 1989, IEEE Comp. Soc. Press, pp. 144–151.

Improved Accuracy for Logarithmic Addition In DSP Applications, Mark G. Arnold et al., ICASSP 88: International Conference of Acoustics, Speech and Signal Processing, Published IEEE, pp. 1714–1717, vol. 3.

Applying Features of IEEE 754 to Sign/Logarithm Arithmetic, Mark G. Arnold et al., IEEE Transactions on Computers, vol. 41, No. 8, Aug. 1992, pp. 1040–1050.

An Accurate LNS Arithmetic Unit Using Interleaved Memory Function Interpolar, David M. Lewis, Proceedings of 11th Symposium on Computer Architecture, 1993, IEEE Comp. Soc. Press, pp. 2–9.

Interleaved Memory Function Interpolars with Application to an Accurate LNS Arithmetic Unit, David M. Lewis, IEEE Transactions on Computers, vol. 43, No. 8, Aug. 1994, pp. 974–982.

A 10–ns Hybrid Number System Data Execution Unit for Digital Signal Processing Systems, Fang–shi Lai, IEEE Journal of Solid–State Circuits, vol. 26, No. 4, Apr. 1991, pp. 590–598.

A Hybrid Number System Processor with Geormetric and Complex Arithmetic Capabilities, Fang–shi Lai et al., IEEE Transactions on Computers, vol. 40, No. 8, Aug. 1991, pp. 952–961.

The Efficient Implementation and Analysis of a Hybrid Number System Processor, Fang–shi Lai, IEEE Transactions on Circuits and Systems–II: Analog and Digital Signal Processing, vol. 40, No. 6, Jun. 1993, pp. 382–392.

FIG. 3
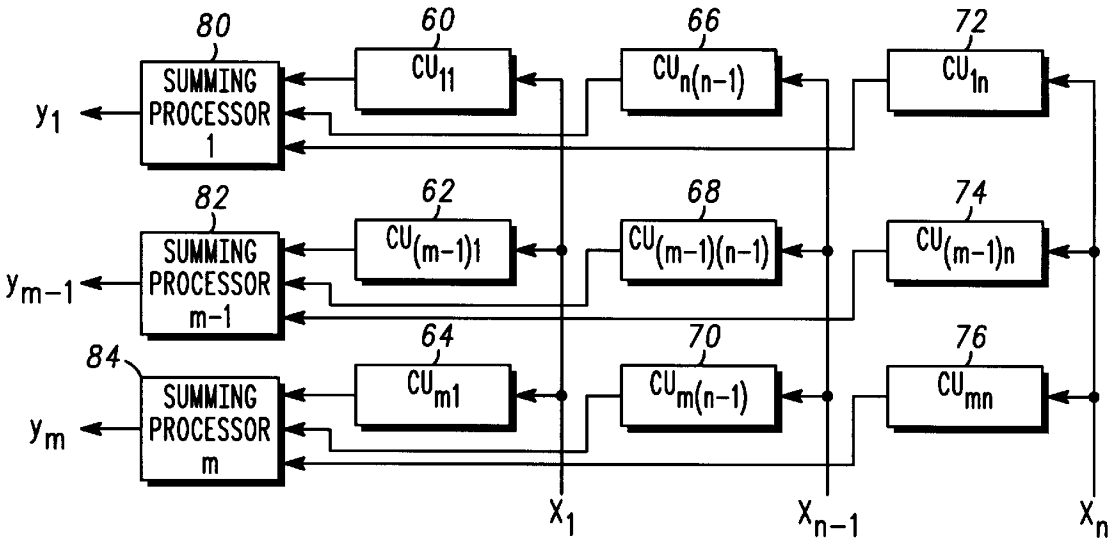
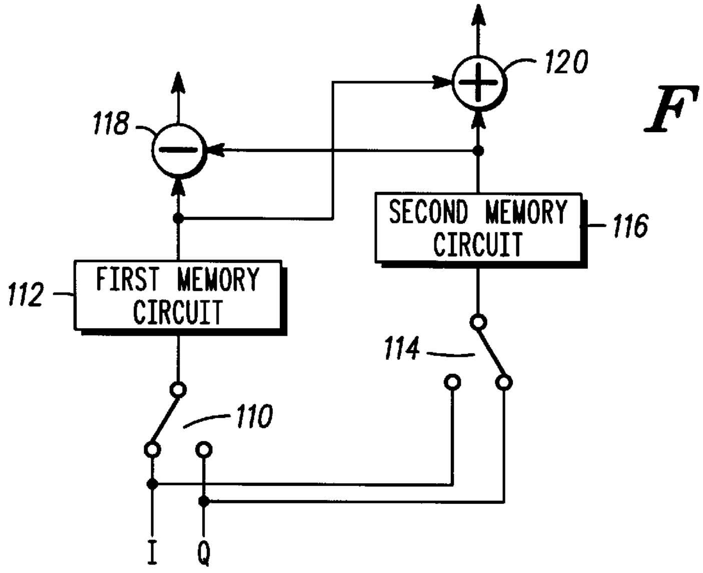
FIG. 6
FIG. 7
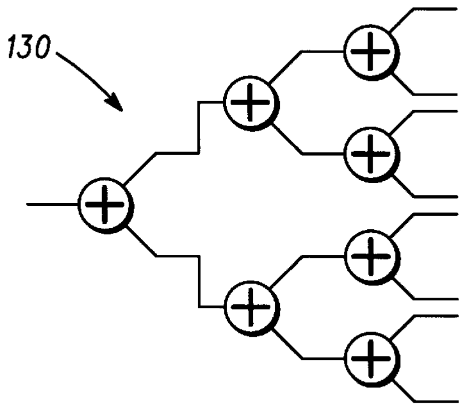

METHOD AND SYSTEM FOR DIGITAL BEAM FORMING

RELATED INVENTIONS

The present invention is related to the following inventions which are assigned to the same assignee as the present invention:

(1) "Logarithm/Inverse-Logarithm Converter Utilizing Linear Interpolation and Method of Using Same", having U.S. Pat. No. 5,600,581, filed on Feb. 22, 1995;

(2) "Logarithm/Inverse-Logarithm Converter Utilizing a Truncated Taylor Series and Method of Use Thereof", having U.S. Pat. No. 5,604,691, filed on Jan. 31, 1995;

(3) "Logarithm/Inverse-Logarithm Converter and Method of Using Same", having U.S. Pat. No. 5,642,305, filed on Jan. 31, 1995; and (4) "Logarithm/Inverse-Logarithm Converter Utilizing Second-Order Term and Method of Using Same", having Ser. No. 08/382,467, filed on Jan. 31, 1995.

The subject matter of the above-identified related inventions is hereby incorporated by reference into the disclosure of this invention.

TECHNICAL FIELD

The present invention relates generally to signal processing in radiated wave communication systems and, in particular, to a beam forming antenna system.

BACKGROUND OF THE INVENTION

The electromagnetic environment is becoming increasingly dense with the proliferation of wireless personal communication devices, such as cellular phones and pagers. Ever more information and sophistication are required from wireless communication systems, placing greater demands on antenna performance. Digital beam forming is a powerful technique for augmenting antenna performance.

The basic principles of digital beam forming have been described in literature. See for example, "Digital Beam forming Antennas An Introduction", by Hans Steyskal, Microwave Journal, January 1987. Generally, a digital beamformer operates in conjunction with a phase-array antenna to enhance the overall quality of radiated data signals. In a receiver, a radiated wave front impinging on an array antenna causes signals received at various antenna elements to differ in phase due to the angle of the wave front relative to the array. The digital beamformer compensates for this phase shift and sums together the different element signals such that maximum signal-to-noise ratio is obtained at its output. In the transmit direction, the beamformer's operation can be reversed, such that the transmitted signal can be made to travel in any desired direction by applying the appropriate phase shifts to each of the element signals.

Although a variety of techniques for beam forming have been developed, current digital beam forming antenna systems lack the computational performance required by many communication system applications. Consequently, there is a need for a digital beam forming system that provides high-performance computational power at low cost.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 3 shows a block diagram of a digital beam former that is accordance with an embodiment of the present invention.

FIG. 6 shows a block diagram representing a third embodiment of a computing unit usable in the digital beam former of FIG. 3.

FIG. 7 shows a block diagram representing a first embodiment of a summing processor that is usable in the digital beam former of FIG. 3.

DETAILED DESCRIPTION OF A PREFERRED EMBODIMENT

It is an advantage of the present invention to provide a system for digital beam forming that economically affords the intensive computational performance required by modern digital phased-array antennas. It is also an advantage of the present invention to provide a method and system of beam forming that can adaptively form or null multiple beams.

Figure 1:
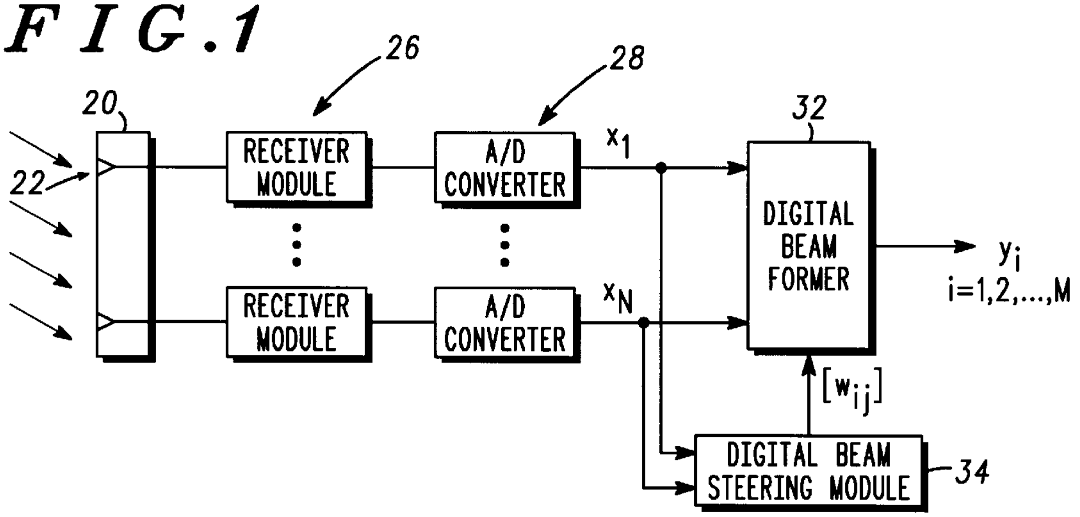
FIG. 1 shows a block diagram of a receiver that incorporates a digital beam forming system.

FIG. 1 shows a block diagram of an array-antenna receiver that incorporates a digital beam former 32 that conforms to an embodiment of the present invention. The receiver includes an array-antenna 20, one or more receiver modules 26, one or more analog-to-digital (A/D) converters 28, the digital beam former 32, and a digital beam steering module 34.

The array-antenna 20 includes elements 22 arranged in a linear array. Received radio frequency (RF) signals are detected and digitized at the element level. The received signals have generally equal amplitudes, but different phases at each element. The signals can represent any number of communication channels.

In response to the received signals, the receiver modules 26 generate analog signals. The receiver modules 26 perform the functions of frequency down-conversion, filtering, and amplification to a power level commensurate with the A/D converter 28. The phase information of the radiated signals is preserved via an in-phase (I) and quadrature (Q) component included in the analog signal. The I and Q components respectively represent real and imaginary parts of the complex analog signal. There is preferably a one-to-one correspondence between the elements 22 and receiver modules 26.

The A/D converters 28 sample and digitize the analog signals to produce digital signals. Each A/D converter is dedicated to processing the signals produced by a respective array element. After the A/D conversion, the digital signals go to the digital beamformer 32 which computes weighted sums $y_i$ representing inner-product beams. Typically, an inner-product beam represents a single communication channel.

Weight values $w_{ij}$ are passed to the digital beam former 32 by the digital beam steering module 34. Using a suitable algorithm, the digital beam steering module 34 adaptively determines the proper weights. This can be done a relatively slow rate compared to the overall data throughput of the antenna system.

Figure 2:
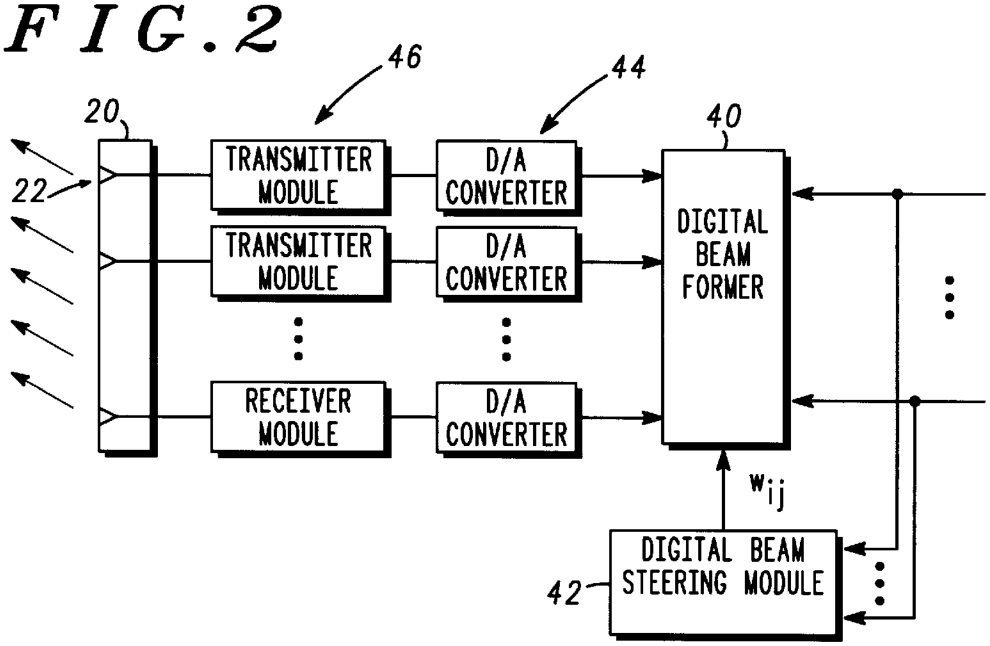
FIG. 2 shows a block diagram of a transmitter that incorporates a digital beam forming system.

FIG. 2 shows a block diagram of an array-antenna transmitter that incorporates a digital beam former 40 that is in accordance with an embodiment of the present invention. The transmitter includes the digital beam former 40, a digital beam steering module 42, one or more digital-to-analog (D/A) converters 44, one or more transmitter modules 46, and the array-antenna 20.

Incoming signals representing one or more channels are passed to the digital beam former 40 and the digital beam steering module 42. The incoming signals include phase information (I and Q components) for each channel. The digital beam former outputs weighted sums corresponding to the elements 22 of the array-antenna 20.

The weights $w_{ij}$ are passed to the digital beam former 40 by the digital beam steering module 42. Using a suitable algorithm, the digital beam steering module 42 adaptively determines the proper weights.

The D/A converters 44 convert the digital output signals of the beam former 40 into corresponding analog signals. The transmitter modules 46 generate radiatable signals in response to the analog signals. The transmitter modules 46 perform the functions of frequency up-conversion, filtering, and amplification. The radiatable signals are then transmitted through the elements 22 of the array-antenna 20.

The digital beam forming antenna systems shown in FIGS. 1–2 have advantage over conventional fixed beam antennas because they can separate closely spaced beam, adaptively adjust beam patterns in response to incoming data, and improve pattern nulling of unwanted RF signals.

FIG. 3 shows a block diagram of the digital beam former according to an embodiment of the present invention. The beam former includes a plurality of computing units (CU's) 60–76 and a plurality of summing processors 80–84. The computing units 60–76 form a processor array. Each column in the processor array receives a corresponding digital signal $x_i$. Upon receiving a digital signal, each computing unit independently weights the signal to generate a weighted signal. The summing processors 80–84 provide a means for summing weighted signals generated by a respective row to produce outputs $y_i$. Essentially, each output signal represents a weighted sum having a form:

$$y_i = \sum_{j=1}^{n} w_{ij} x_j \tag{1}$$

Equation (1) can be construed as representing the general form of a discrete Fourier transform. Consequently, the architecture of the digital beam former lends itself to high-speed, parallel computation of discrete Fourier transforms.

Figure 4:
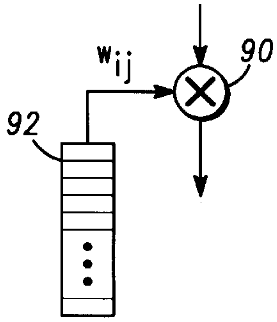
FIG. 4 shows a block diagram representing a first embodiment of a computing unit usable in the digital beam former FIG. 3.

FIG. 4 shows a block diagram representing a first embodiment of a computing unit usable in the digital beam former of FIG. 3. The computing unit includes a multiplier 90 and a memory circuit 92. The computing unit weights an incoming digital signal by multiplying it by a pre-computed weight value $w_{ij}$ stored in the memory circuit 92. The output of the multiplier 90 represents the weighted signal.

The memory circuit 92 can be any means for storing values whose contents are up-datable by the digital beam steering module 34, 42, such as a ROM (read only memory), EEPROM (electrically erasable programmable read only memory), DRAM (dynamic random access memory), or SRAM (static random access memory).

Figure 5:
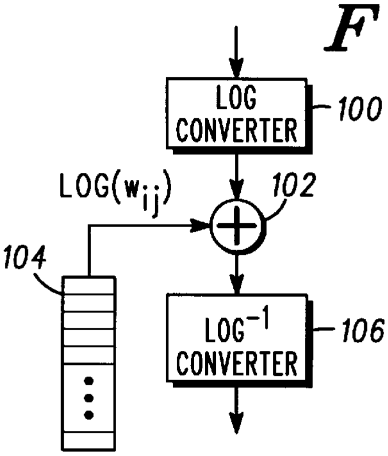
FIG. 5 shows a block diagram representing a second embodiment of a computing unit usable in the digital beam former of FIG. 3.

FIG. 5 shows a block diagram representing a second embodiment of a computing unit usable in the digital beam former of FIG. 3. In this embodiment of the computing unit, an incoming signal is weighted using logarithmic number system (LNS) arithmetic. LNS-based arithmetic provides advantage because multiplication operations can be accomplished with adders instead of multipliers. Digital adder circuits tend to be much smaller than comparable multiplier circuits, thus, the size the beam forming processor array can be reduced by incorporating LNS-based computing units.

The LNS-based computing unit includes a log converter 100, an adder 102, a memory circuit 104, and an inverse-log ($\log^{-1}$) converter 106. An incoming signal is first converted to its respective log signal by the log converter 100. The adder 102 then sums the log signal and a logged weight value from the memory circuit 104 to produce a sum. The sum is then converted to the weighted signal by the inverse-log converter 106.

The log converter 100 and inverse-log converter 106 can be implemented using any of the converters described in the co-pending U.S. patent applications of above-identified Related Inventions Nos. 1–4.

FIG. 6 shows a block diagram representing a third embodiment of a computing unit usable in the digital beam former of FIG. 3. This embodiment of the computing unit is intended to weight complex signals. In many applications, the I and Q components of the complex digital signals are represented by a pair of 3-bit words. Although it is not limited to small word lengths, the computing unit of FIG. 6 provides advantage in such applications because it requires less power and space when implemented using an integrated circuit.

The computing unit includes a first switch 110, a first memory circuit 112, a second switch 114, a second memory circuit 116, a subtractor 118, and an adder 120. The first memory 112 stores first pre-computed values that are based on an imaginary weight $W_i$. The second memory 116 stores second pre-computed values that are based on a real weight $W_r$.

The purpose of the computing unit is to multiply two complex numbers:

$$(I+iQ)(W_r+iW_i)=(IW_r-QW_i)+i(IW_i+QW_r) \tag{2}$$

Essentially, the computing unit calculates the right-hand side of equation (2). The first memory 112 stores the pre-computed values $IW_i$ and $QW_i$, while the second memory 116 stores the pre-computed values $IW_r$ and $QW_r$. It will be apparent to one of ordinary skill in the art that using 3-bit words to represent the complex components and weights would require each memory to store eight 6-bit words.

The first switch 110 provides a means for addressing the first memory circuit using either the I or Q component to select one of the first pre-computed values as the first memory circuit output. The second switch 114 provides a means for addressing the second memory 116 using either the I or Q component to select one of the second pre-computed values as the second memory circuit output.

The subtractor 118 subtracts the first memory output from the second memory output to generate the weighted in-phase component ($IW_r$–$QW_i$) that is then included in the weighted signal. The adder 120 sums the first memory output and the second memory output to generate the weighted quadrature component ($IW_i$+$QW_r$) that is also included in the weighted signal.

In one embodiment of the computing unit, the subtractor 118 includes an adder capable of summing 2s-complement numbers. The pre-computed values are either stored in the memory as 2s-complement values or additional logic circuitry is placed in the computing unit to convert the pre-computed values to their respective 2s-complement values.

Preferably, the subtractor 118 includes an adder having a carry input set to one and inverters to form the 1s-complement value of the second memory output. The adder effectively utilizes the 2s-complement value of the second memory output by summing the carry input and the 1s-complement value.

FIG. 7 shows a block diagram representing a first embodiment of a summing processor that is usable in the digital beam former of FIG. 3. This particular embodiment of the comprises an adder tree 130. The adder tree 130 includes adders which are connected together in a fashion which allows three or more input signals to be summed concurrently. When using the adder tree topology depicted by FIG. 7, N−1 adders are required to sum N inputs. Regarding the example shown in FIG. 7, eight input signals can be received simultaneously, thus, seven adders are required in the adder tree 130. If one wishes to sum a greater number of input signals, more adders are required. For instance, in order to sum 128 input signals, the adder tree would require 127 adders. The adder tree 130 has advantage because it presents less of a delay in providing output sums.

Figure 8:
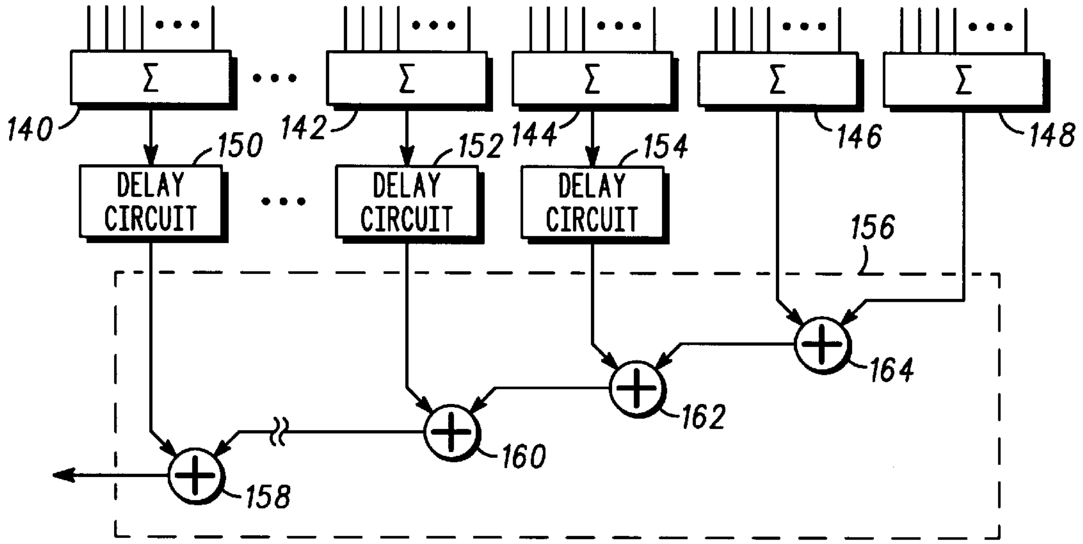
FIG. 8 shows a block diagram representing a second embodiment of a summing processor that is usable in the digital beam former of FIG. 3.

FIG. 8 shows a block diagram representing a second embodiment of a summing processor that is usable in the digital beam former of FIG. 3. This summing processor embodiment includes a plurality of summers 140–148, a plurality of delay circuits 150–154, and a ripple adder 156. Although this summing processor topology may require more time to generate a final sum than a comparable adder tree, it requires less area when implemented in an integrated circuit.

Each of the summers 140–148 sums weighted signals from a group of computing units residing in a same row to produce a weighted sum signal. A summer can include any means for summing weighted signals, such as an adder tree or an accumulator that sequentially adds inputs.

The delay circuits 150–154 produce delayed signals by buffering the weighted sum signals for a predetermined time. Generally, the weighted signals are produced at the summer outputs at approximately the same time. In order to correctly sum the weighted signals, it is necessary to delay weighted signals that are generated in the downstream portion of a processor row. The delay time is a function of the location of the group of computing units within the processor columns.

The ripple adder 156 includes two or more adders 158–164 cascaded together in order to sum the delayed signals and first two weighted sums. The output of the ripple adder 156 represents the total sum of all weighted signals in a given processor row.

Figure 9:
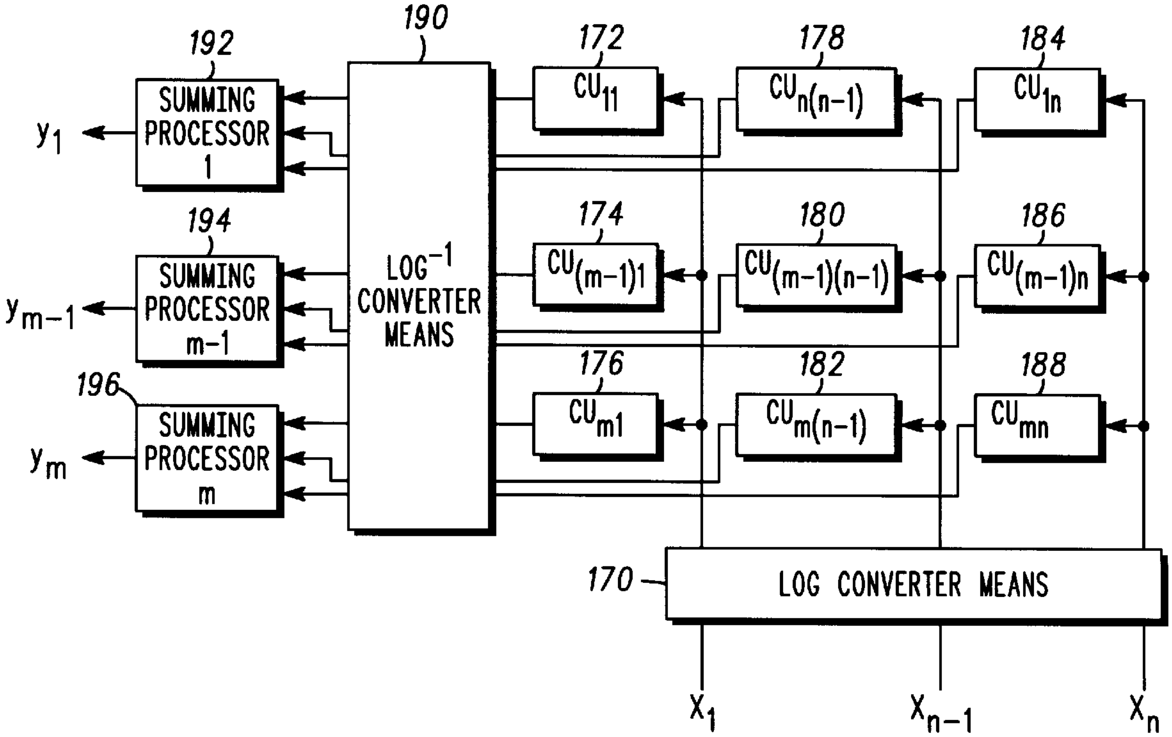
FIG. 9 shows a block diagram of a digital beam former that is in accordance with a second embodiment of the present invention.

FIG. 9 shows a block diagram of a digital beam former that is in accordance with a second embodiment of the present invention. This embodiment of the beam former includes a log converter 170, a plurality of computing units 172–188, an inverse-log converter 190, and a plurality of summing processors 192–196. The computing units 172–188 form a processor array. Incoming digital signals are first converted to log signals by the log converter 170. Each column in the processor array receives a corresponding log signal. Upon receiving a log signal, each computing unit independently weights the signal to generate a sum signal. The sum signals are then converted to weighted signals by the inverse-log converter 190. For each processor row, the weighted signals are respectively summed by one of the summing processors 192–196 to generate an output signal.

The log converter 170 and inverse-log converter 190 can be implemented using any of the converters described in the co-pending U.S. patent applications of above-identified Related Inventions Nos. 1–4.

Figure 10:
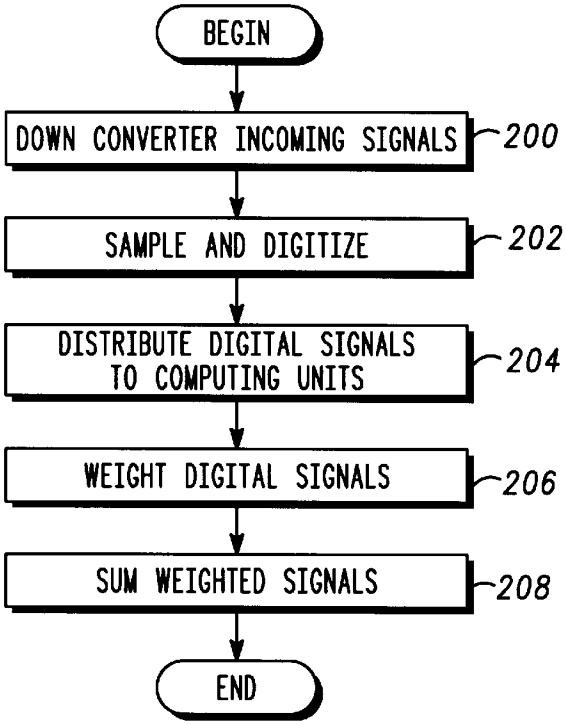
FIG. 10 illustrates a flow diagram of a method of using the digital beam forming system of FIG. 3 in a receiver.

FIG. 10 illustrates a flow diagram of a method of using the digital beam former of FIG. 3 in a receiver.

In box 200, incoming radiated signals are down-converted into analog signals. In box 202, the analog signals are sampled and digitized into digital signals. In box 204, the digital signals are distributed to the array of computing units. Next, in box 206, the digital signals are weighted to generate the weighted signals. In box 208, the weighted signals are respectively summed for each of the processor rows, whereby producing the output signals.

Regarding box 206, the digital signals can be weighted as a function of one or more pre-computed values that are retrieved from a memory circuit. This can be accomplished by multiplying the digital signals by the weight values. The stored values are pre-computed from the digital signal and can be updated at various times to adaptively alter the weighting of the digital signals.

Figure 11:
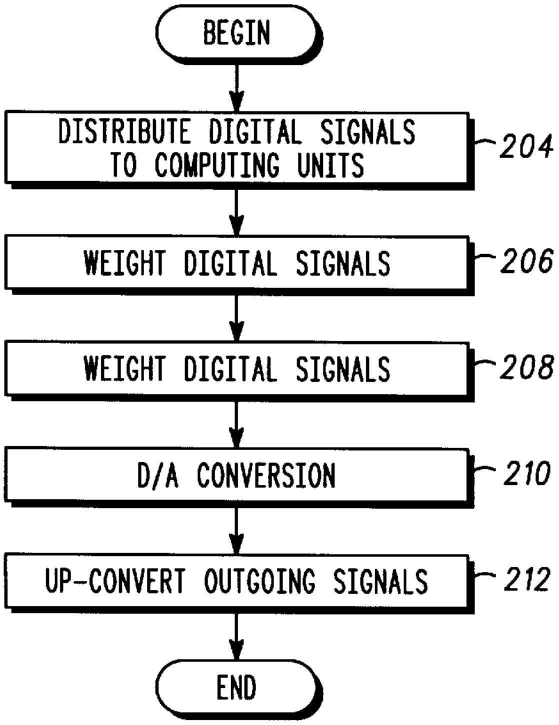
FIG. 11 illustrates a flow diagram of a method of using the digital beam former of FIG. 3 in a transmitter.

FIG. 11 illustrates a flow diagram of a method of using the digital beam former of FIG. 3 in a transmitter. This method incorporates the steps described in conjunction with boxes 204–208 of FIG. 10.

In box 210, the digital output signals of the beam former are converted into analog signals. In box 212, the analog signals are up-converted into radiatable signals which can be transmitted through an array-antenna.

Figure 12:
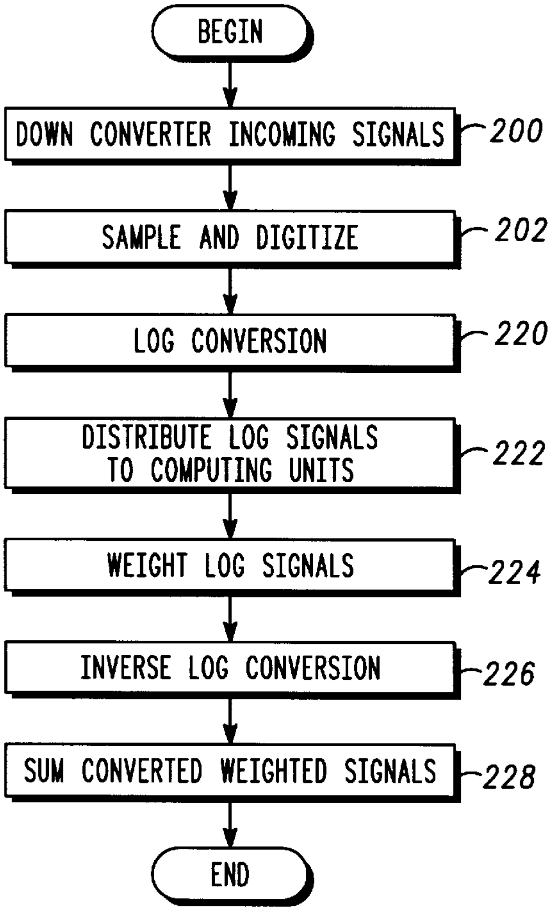
FIG. 12 illustrates a flow diagram of a method of using the digital beam former of FIG. 9 in a receiver.

FIG. 12 illustrates a flow diagram of a method of using the digital beam former of FIG. 9 in a receiver. This method incorporates the steps described in conjunction with boxes 200–204 of FIG. 10.

In box 220, the digital signals are converted into log signals. In box 222, the log signal are distributed to the array of computing units. Next, in box 224, the log signals are summed with corresponding log-converted weight values to generate the sum signals. In box 226, an inverse-log conversion is performed on the sum signals to produce the weighted signals. In box 228, the weighted signals are respectively summed according to processor rows in order to generate the output signals.

Figure 13:
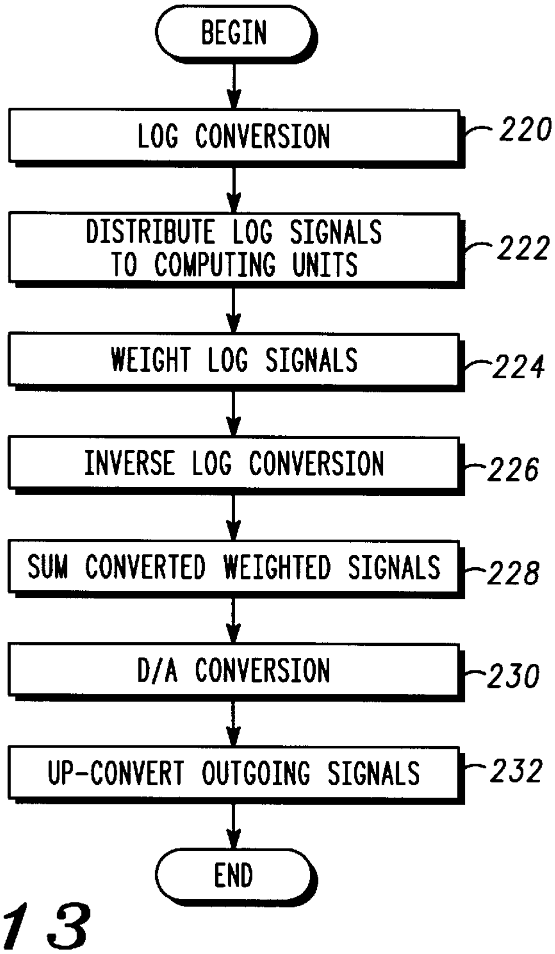
FIG. 13 illustrates a flow diagram of a method of using the digital beam former of FIG. 9 in a transmitter.

FIG. 13 illustrates a flow diagram of a method of using the digital beam former of FIG. 9 in a transmitter. This method incorporates the steps described in conjunction with boxes 220–228 of FIG. 12.

In box 230, the digital output signals of the beam former are converted into analog signals. In box 232, the analog signals are up-converted into radiatable signals which can be transmitted through an array-antenna.

To summarize, there has been described herein a concept, as well as several embodiments, including a preferred embodiment, of a method and system of digital beam forming which can be used to improve the performance of array-antenna systems. Because various embodiments of the methods and systems as herein-described utilize arrays of computing units, they can perform massively parallel operations which allows for a vast increase in system performance. Other embodiments of the present invention utilize LNS-based arithmetic which allows the overall size of the computing unit array to be reduced when implemented using digital logic circuits.

While specific embodiments of the present invention have been shown and described, it will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. An apparatus for beam forming a plurality of channels in a communications system, the processor being operatively coupled to an array-antenna and responsive to a plurality of digital signals representing the plurality of channels, comprising:

a plurality of computing units forming an array having a plurality of rows and a plurality of columns, each of the plurality of columns weighting one of the digital signals to generate a plurality of weighted signals, wherein at least one of the plurality of computing units comprises a log converter for converting one of the plurality of digital signals into a log signal, an adder for summing the log signal and a log-converted weight value to generate a sum signal, and an inverse-log converter for converting the sum signal into one of the plurality of weighted signals; and a summing processor for generating a plurality of output signals, each of the plurality of output signals being produced by summing ones of the plurality of weighted signals generated by a respective one of the plurality of rows.

2. The apparatus of claim 1, wherein the summing processor comprises:

a plurality of adder trees for generating the plurality of output signals, each of the adder trees being operatively coupled to a corresponding row in order to generate one of the output signals.

3. The apparatus of claim 1, wherein the at least one of the plurality of computing units comprises:

a memory circuit for storing the log-converted weight value; and means for retrieving from the memory circuit the log-converted weight value.

4. The apparatus of claim 1, for use in a receiver, further comprising:

a plurality of receiver modules, operatively coupled to a corresponding plurality of elements included in the array-antenna, for down-converting a plurality of radiated signals into a plurality of analog signals; and a plurality of analog-to-digital converters for sampling and digitizing the plurality of analog signals to produce the plurality of digital signals.

5. The apparatus of claim 1, for use in a transmitter, further comprising:

a plurality of digital-to-analog converters for generating a plurality of analog signals, each of the plurality of digital-to-analog converters converting a corresponding one of the plurality of output signals into an analog signal, thereby producing a plurality of analog signals; and a plurality of transmitter modules, each being operatively coupled to a corresponding one of the plurality of digital-to-analog converters, for up-converting the plurality of analog signals into a plurality of radiatable signals that are transmittable through a plurality of elements included in the array-antenna.

6. A method of beam forming a plurality of channels in a communications system, comprising the steps of:

distributing a plurality of digital signals representing the plurality of channels to a plurality of computing units forming an array having a plurality of rows and a plurality of columns;

converting the plurality of digital signals into a plurality of log signals;

summing the plurality of log signals and a corresponding plurality of log-converted weight values to generate a plurality of sum signals;

performing an inverse-log conversion on the plurality of sum signals to generate a plurality of weighted signals; and generating a plurality of output signals, each of the output signals being generated by summing the weighted signals corresponding to a respective one of the rows.

7. The method of claim 6, further including the step of retrieving from at least one memory the plurality of log-converted weight values.

8. The method of claim 6, for use in a receiver, further comprising the following steps:

down-converting a plurality of radiated signals into a plurality of analog signals; and sampling and digitizing the plurality of analog signals to produce the plurality of digital signals.

9. The method of claim 6, for use in a transmitter, further comprising:

converting the output signals into a plurality of analog signals; and up-converting the analog signals into a plurality of radiatable signals.

* * * * *